United States Patent [19]

Meister

[11] Patent Number: 5,378,302
[45] Date of Patent: Jan. 3, 1995

[54] TRAVELING LARGE-AREA WELDING MACHINE FOR WELDING PLASTIC SHEETS

[75] Inventor: Anton Meister, Sarnen, Switzerland

[73] Assignee: Meistermatic AG, Sarnen, Switzerland

[21] Appl. No.: 24,411

[22] Filed: Mar. 1, 1993

[30] Foreign Application Priority Data

Mar. 6, 1992 [CH] Switzerland .................. 00720/92

[51] Int. Cl.⁶ .............................................. B32B 31/00
[52] U.S. Cl. .................................... 156/497; 156/499; 156/574
[58] Field of Search .............. 156/497, 499, 574, 523, 156/579

[56] References Cited

U.S. PATENT DOCUMENTS

| | | | |
|---|---|---|---|
| 3,623,565 | 11/1971 | Ward | 180/6.2 |
| 3,866,700 | 2/1975 | Bauer | 180/6.48 |
| 4,440,588 | 4/1984 | Stevenson | 156/497 |
| 4,447,288 | 5/1984 | Seaman | 156/497 |
| 4,861,412 | 8/1989 | Meister . | |
| 4,872,941 | 10/1989 | Lippman et al. | 156/574 |
| 4,923,558 | 5/1990 | Ellenberger | 156/499 |

FOREIGN PATENT DOCUMENTS 0279306 8/1988 European Pat. Off. .

*Primary Examiner*—Chester T. Barry
*Attorney, Agent, or Firm*—McAulay Fisher Nissen Goldberg & Kiel

[57] ABSTRACT

A welding machine has a press-on and advancing movement device with two press-on rollers which are arranged one after the other and are driven jointly, a press-on belt being looped around the press-on rollers. The front roller, as seen in the traveling direction, is supported in such a way that it can be lifted when traveling over uneven surfaces so that straight running is maintained. To improve this further, the two traveling rollers which run in advance and are arranged so as to be laterally offset are supported at a swivel plate so that the traveling track can be adjusted. Further, the shaft of the two traveling rollers is not directly driven, but rather a slip clutch in the form of two rubber blocks is arranged between it and a separate drive shaft. The latter as well as the two press-on rollers are synchronously driven by a motor by way of a toothed belt.

3 Claims, 3 Drawing Sheets

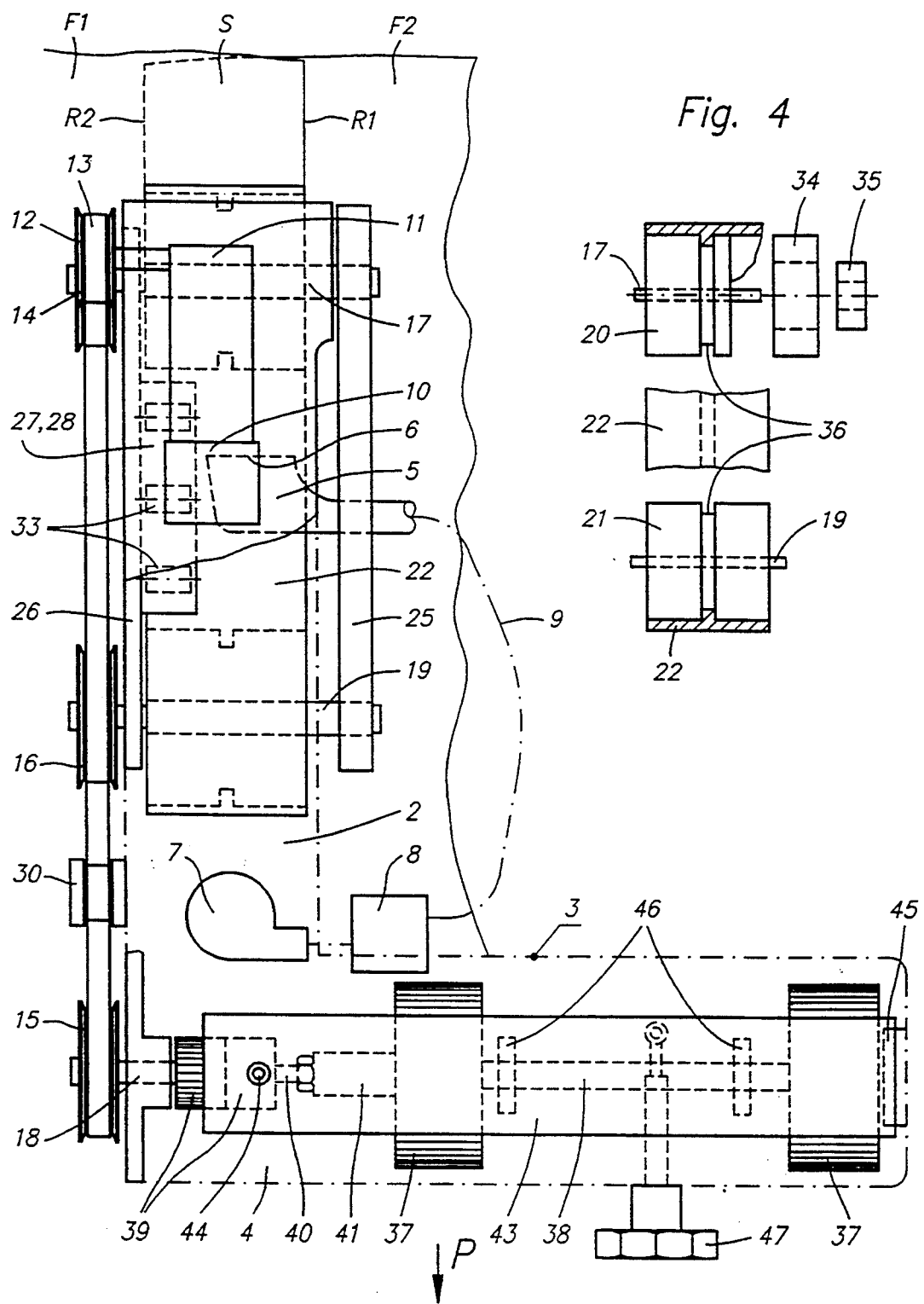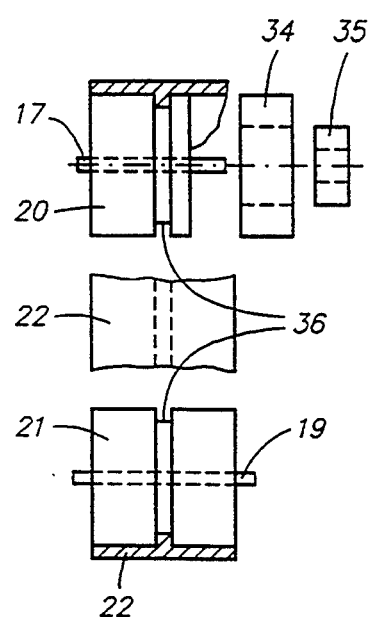

TRAVELING LARGE-AREA WELDING MACHINE FOR WELDING PLASTIC SHEETS

BACKGROUND OF THE INVENTION a) Field of the Invention

The invention is directed to a movable or traveling large-area welding machine for welding plastic sheets spread out upon a substratum and which overlap over the width of a zone, having a frame formed by a first leg extending in the direction of travel of the machine and a second leg arranged transversely to the latter. The first leg has means for welding the two sheets in the aforementioned zone as well as contact-pressure or press-on means running on this zone for loading the welded sheets against the substratum, and the second leg is provided with traveling rollers arranged on a common axle. The aforementioned press-on means include a press-on roller which is connected via a common drive with the traveling rollers which are arranged so as to be offset to the latter in the direction of travel as well as transversely thereto.

b) Background Art

Such welding machines are used to weld together plastic sheet webs having a large surface area and a considerable length, particularly for sealing roofs, floors and walls. For this purpose, such a machine has, for example, a hot air nozzle which acts between the overlapping edges of the sheets. The exiting hot air melts the two edges which are then pressed together and welded with one another.

A machine of the type indicated above is already shown and described in EP-A-O 279 306. Although this machine has proven substantially successful, certain difficulties are revealed with respect to advancing the device on the spread out sheets and in keeping to the traveling track along the overlapping zone, chiefly when traveling over uneven surfaces of the underlying base or substratum.

The problems of constructing such a machine will be discussed briefly in this connection. As already mentioned, this machine must run along long sheet webs in a straight line as far as possible. For this purpose, it would not be advisable to provide a steering mechanism in the manner of an automotive vehicle, i.e., a steering axle, because, apart from the required expenditure on construction and control means, play would be introduced in the steering members which would constitute a severe impediment to straight running. However, if no steering mechanism were provided, the rollers of the machine, all of which are driven according to the cited prior art, would have to have exactly the same outer diameter. In this respect, it must be considered that at least the traveling rollers have a friction or traction lining at their circumference, that is, an applied ring of material which can be resiliently compressed so that straight running is made considerably more difficult. It is likewise impossible for the traveling rollers at the front as seen in the traveling direction to run along loosely instead of being driven, since the rear press-on roller (which is then driven alone) is laterally offset relative to the track of the front traveling rollers. Therefore, the rolling resistance of the latter would lead to a turning moment in the traveling plane, resulting in a relatively rapid divergence from straight running. Another requirement for such a traveling welding machine consists in that upsetting such as bulging or the occurrence of waves or "bubbles" in the spread out sheet webs due to the longitudinal movement must be prevented, if possible. However, such upsetting can be caused even by slight differences in the circumferential speed of the press-on means and the traveling rollers.

OBJECTS AND SUMMARY OF THE INVENTION

The present invention therefore has, as a primary object, the further development of a welding machine of the aforementioned type in that its straight running is ensured and particularly is not interfered with by unevenness in the substratum on which the sheets are spread out, and further in that the flat arrangement of the sheets is not interfered with by the traveling device.

This object and others are met according to the invention by a construction of a traveling large area welding machine for welding plastic sheets spread out upon a substratum and overlapping over the width of a zone, having a frame formed by a first leg extending in the traveling direction of the machine and a second leg arranged transversely to the latter. The first leg has means for welding the sheets in the zone as well as contact-pressure or press-on means running on this zone for loading the welded sheets against the substratum. The second leg is provided with traveling rollers arranged on a common axle. The press-on means include a press-on roller which is connected by way of a common drive with the traveling rollers which are arranged so as to be offset to the latter in the direction of travel as well as transversely thereto. The improvement comprises that the press-on roller is supported at the first leg on an axle. The press-on roller is supplemented by additional press-on means to form a press-on and advancing movement device. The additional press-on means are freely movable vertically relative to the press-on roller and are driven by the common drive via an additional axle. The common axle carrying the traveling rollers being driven by a separate drive axle via a resilient slip clutch.

As a result, a perfect synchronous running of the drive means rolling along the sheets is accordingly achieved. Further, the construction of the press-on and advancing device also enables a favorable guidance of the sheets and arrangement of the welding means, particularly when using a hot air nozzle.

For a better understanding of the present invention, reference is made to the following description and accompanying drawings while the scope of the invention will be pointed out in the appended claims.

BRIEF DESCRIPTION OF THE DRAWINGS

FIG. 1 shows a top view of the machine according to the invention, a portion of its frame being shown in dash-dot lines and various parts arranged thereon being indicated only schematically;

FIG. 4 shows a partially exploded sectional view of the press-on and advancing movement device.

DESCRIPTION OF THE PREFERRED EMBODIMENTS

Figure 2:
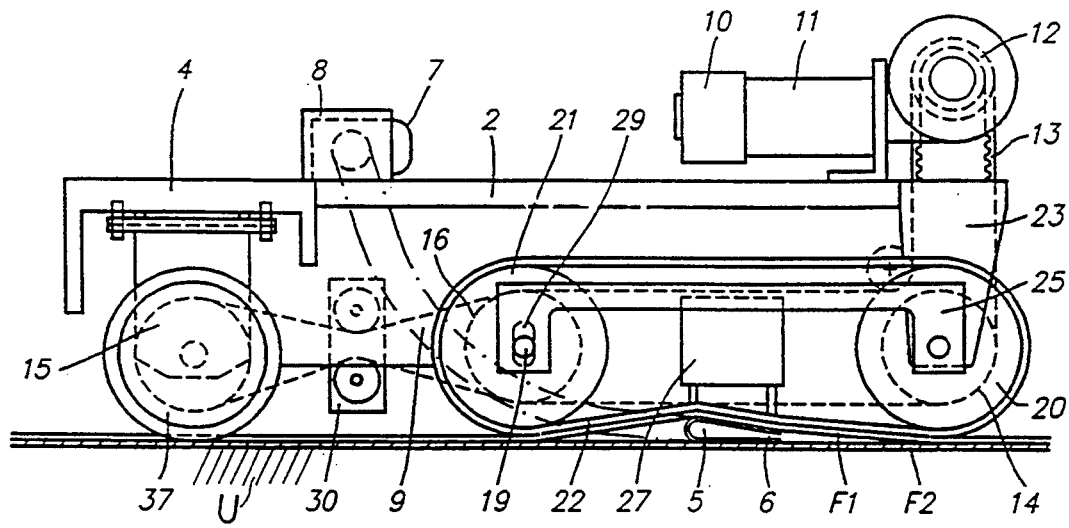
FIG. 2 shows a side view of the inventive machine as seen from the right in FIG. 1, with individual parts omitted.

As is already described in the above-mentioned EP-A--O 279 306, two plastic sheets F1, F2 which are spread out side by side upon a substratum U are welded together by the machine inside the zone S which is formed by their overlapping edges R1, R2. During this welding process, the machine moves in the direction of arrow P, i.e. parallel to the edge Ill of the upper sheet F1 in zone S. The frame 3 of the machine is L-shaped with a leg 2 extending in the direction of travel and a leg 4 extending transversely thereto. The welding is effected by means of a heating nozzle 5 whose outlet 6 is inserted between the upper side of the lower sheet F2 and the underside of the upper sheet F1 before the movement or welding commences. The edge of the upper sheet F1 must therefore be curved upward somewhat and temporarily (resiliently) stretched. The hot air melts the two sheet surfaces and the latter are then pressed together as will be described in the following. The air is fed from a blower 7 to a heating unit 8, is heated in the latter and then flows via a pipeline or a hose 9 to the nozzle 5. Since the hot air welding itself is not the subject matter of the invention, these parts are shown only symbolically.

A motor 10 drives a first toothed belt disk or pulley 12 by means of a gear box or transmission unit 11, preferably a worm gear. This toothed belt disk 12 in turn sets a toothed belt 13 in motion which drives axle drive wheels or pulleys 14, 15, 16 (see also FIGS. 2 and 5). The wheel 14 drives a shaft 17, the wheel 15 drives a shaft 18, and wheel 16 drives a shaft 19.

A first or rear press-on roller 20 which belongs to a press-on and advancing movement device (FIG. 4) is arranged on the shaft 17. It is supplemented by a second or front press-on roller 21 which is arranged on the shaft 19, driven by the latter, and connected with the first or rear press-on roller 20 via a press-on belt 22. The press-on belt 22 and the front roller 21 as seen in the direction of travel have a width which approximately corresponds to the overlapping of the sheets F1, F2, i.e., the width of zone S. However, the rear roller 20 is narrower. This will be discussed later with reference to FIG. 4. It is supported on the shaft 17 between an approximately trapezoidal bearing plate 23 (FIG. 2) and a side wall 24 of the leg 2. The second or front press-on roller 21 has exactly the same diameter as the first or rear press-on roller 20. At the same time, however, it must be capable of absorbing any unevenness to be traveled over when the upper sheet F1 is pressed on the lower sheet F2 against the underline base or substratum by this roller 21. Therefore, the roller 21—which is likewise driven—must be vertically adjustable or displaceable. This is achieved by two lateral holders 25, 26. The two holders 25 and 26 swivel around the shaft 17 on which they are supported and in turn support the shaft 19 with the front roller 21.

Figure 5:
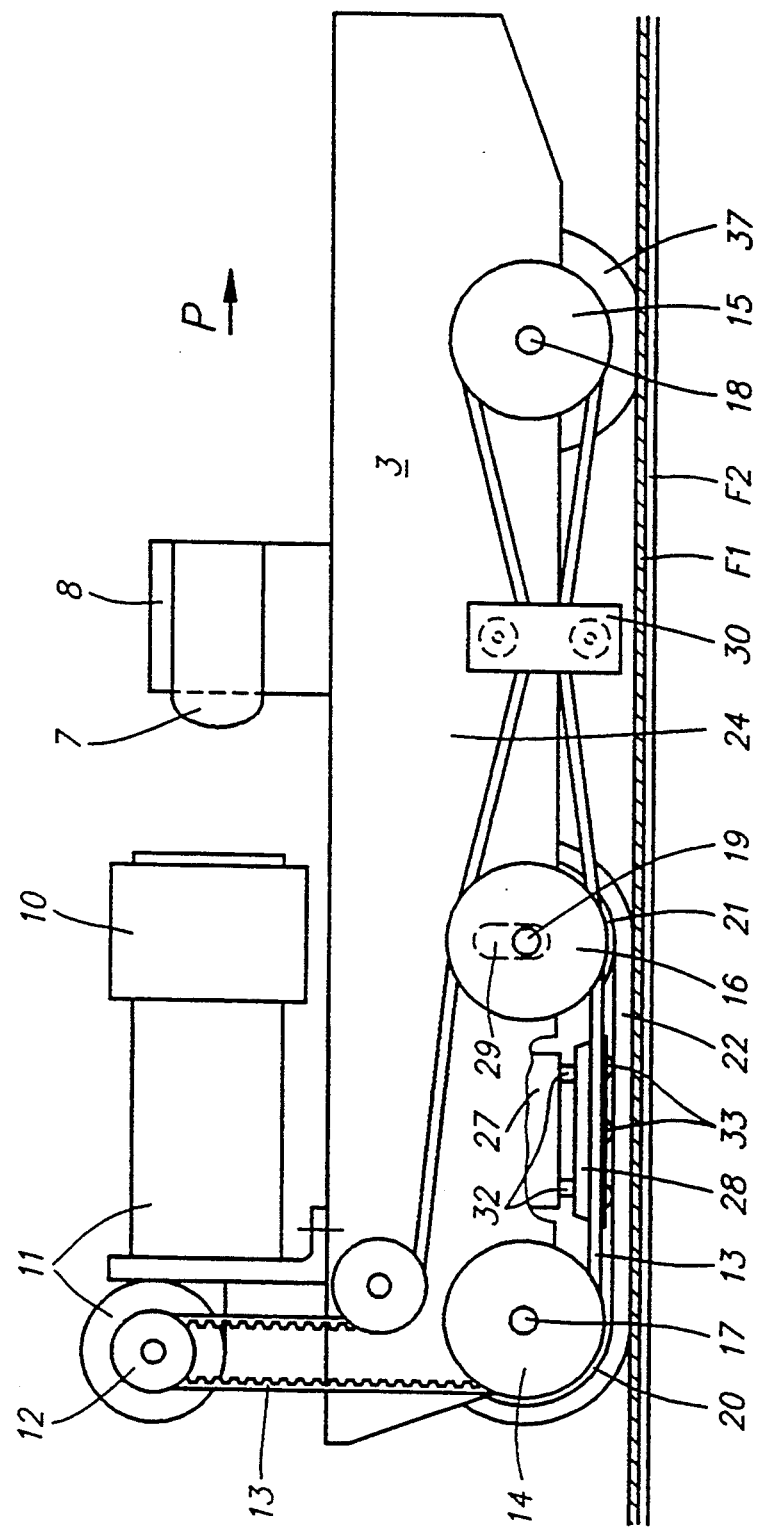
FIG. 5 shows a side view of the machine from the left as seen in FIG. 2.

The holder 26 is guided between the side wall 24 and a plate-shaped stationary base 27 on which a press-on shoe 28 is supported in a springing manner. The base 27 is at a corresponding distance from the side wall 24, but is rigidly connected with it. The holder 26 situated therebetween the latter is therefore guided so as to be movable vertically and a lateral displacement of the roller 21 is prevented. As can be seen particularly from FIGS. 1 and 2, the hot air nozzle 5 is located in the region between the two press-on rollers 20 and 21. In this region, it lifts the upper sheet F1 and the lower portion of the press-on belt 22 slightly and forms a pocket in which the hot air can exit through the nozzle slot 6 directed to the rear. The aforementioned pocket is closed in the front and in the rear by the press-on rollers lying on top of it and laterally between the front and back by the pressure shoe 28 (FIG. 5).

However, the vertically adjustable roller 21 is driven by the toothed belt disk or pulley 16 which is located outside the side wall 24. Therefore, the sidewall 24 has a vertical slot 29 (FIG. 2) in which the shaft 19 can move up and down. Due to the preferably toothed drive, the toothed belt disk or pulley 16 can easily adjust or displace itself in height relative to the toothed belt disks or pulleys 14, 15 which are arranged so as to be stationary. A belt tightener 30 is arranged between the disks or pulleys 15 and 16 so that the disk or pulleys 16 does not disengage from the upper or lower runs of the belt 13 during this movement. The belt tightener 30 includes two lateral bearing plates and two rollers between which the two runs or portions of the belt, 13 extend or pass through. The belt tightener 30 is centered between the disks 15 and 16 by the belt 13 itself in a "cantilevering" or floating manner.

The press-on shoe 28 is supported so as to be vertically movable at the stationary base 27 by means of springs 32 and is provided with rollers 33 which press on the press-on belt 22 and via the latter on the sheets F1 and F2 and against the substratum U. As already mentioned, the press-on shoe 28 is arranged at the side, specifically over the edge R2 of the lower sheet F2 (FIG. 1), so that the air escapes into the atmosphere from the nozzle 5 toward the other side over the sheet F2.

The synchronous running of the two press-on rollers 20, 21 caused by the identical toothed belt disks or pulleys 14, 16 and the possibility described above for the vertical movement of the front roller 21 are steps or measures taken to ensure the straight running of the machine. These steps or measures are supplemented by another advantageous construction of the press-on and advancing movement device which is explained in the following. In order to achieve a particularly good contact pressure along the width of the device, i.e. of the zone S, the rear press-on roller 20 is constructed so as to be substantially narrower than the front on press-on roller 21 (FIG. 4) and is supplemented by an annular roll 34 which runs on a hub 35. The hub 35 sits securely on the shaft 17 while the massive or solid, heavy ring roller or annular roll 34 runs on the shaft 17 it with considerable radial play while remaining axially parallel to the rear press-on roller 20. Within the conceptual framework of this invention the term "axially parallel" is to be understood to mean that the rotational axis of the annular roll 34 remains substantially spatially parallel to the rotational axis of the rear press-on roller 20 without necessarily maintaining coaxiality. It accordingly provides for a steady, firm contact pressure against the edges R1 and R2 of the sheets F1 and F2 at the rear end of the device. If the rear roller 20 were the same width as the front roller 21, traveling over an irregularities uneven surface of only a narrow width could result in a tendency toward an oblique position or attitude of the machine, which could in turn cause a divergence from straight running. The annular roll 34 is carried along or entrained by the press-on belt 22, since it lies directly adjacent to the rear roller 20. The press-on belt 22 has a longitudinal rib on its inside which runs into the rollers 20, 21, in a guide grove 36.

Figure 3:
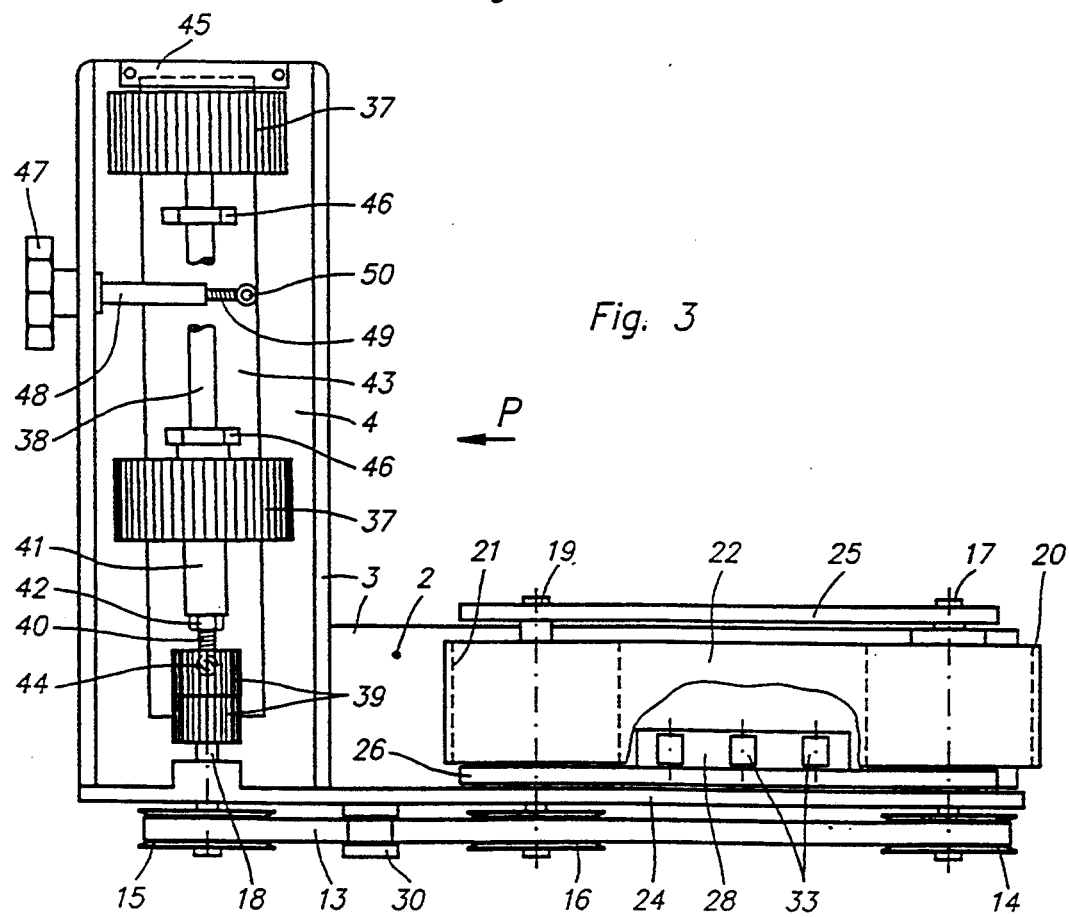
FIG. 3 shows a view of the inventive machine shown in FIG. 1 from below.

Another step for ensuring straight running and especially for preventing the curling up or bulging of the sheets F1 and F2 due to the traveling movement of the machine can be seen chiefly in FIG. 3. This step concerns the drive of the shaft or traveling roller axle 38 proceeding from the toothed belt disk or pulley 15. The toothed belt disk or pulley 15 has the same number of teeth as the disks or pulleys 14, 16 and the traveling rollers 37 driven by it have the same diameter as the rollers 20, 21 with the belt 2 running over them. The shaft 18 on which the disk or pulley 15 sits serves to drive the traveling rollers 37 which not only run at a considerable distance in front of the front press-on roller 21, but are also sharply offset laterally relative to it and therefore no longer run on the zone S with the double sheet thickness, but only on sheet F2. This lateral offset prevents an oblique position of the machine transversely relative to the traveling direction.

It has been found shown that a curving or upward bulging of the sheets F1 and F2 occurs persistently in the case of a "rigid", or absolutely synchronous drive of the axles rollers 19 and of the traveling roller axle 38. Since the traveling rollers 37 have a rubber-elastic friction lining, different effective drive radii can result between the traveling rollers 37 and the press-on and advancing movement device depending on the distribution of weight or weight loading of the machine. For this reason, the drive of the traveling rollers 37 by the toothed belt disk or pulley 15 is now not effected directly by means of a continuous shaft. Rather, two shafts or axles 18 and 38 are provided which are axially aligned with one another and separate. A resilient slip clutch with two resilient rubber blocks or pads 39 which contact one another at their front or end faces accompanied by axial pressure is arranged between these shafts or axles 18 and 38. The block on the shaft 38 is arranged on a threaded bolt or stud 40 which is rotatably supported in a threaded sleeve 41 and is secured in its axial relative position by a nut 42. The required clutch pressure or thrust can be adjusted by means of this. This clutch thrust must ensure that the axle 38 along with the traveling rollers 37 is entrained, but on the other hand may not be too excessive so that a compensation of rotational differences is possible by corresponding slippage between the blocks or pads 39.

Finally, it is advisable to support the shaft or traveling roller axle 38 so as to be adjustable so that the possibility of an accurate directional adjustment of the traveling rollers 37 is also provided. To this end, a swivel plate 43 is arranged at the underside of the leg 4. It is supported at the leg 4 in a journal 44 at its end facing the leg 2 and can swivel around this journal 44 and slides at the other end on a bearing or support 45. Two axle holders 46 for the shaft 38 are arranged at the swivel plate 43. The swiveling is effected by means of a turning or rotary knob 47 with a threaded sleeve 48 and threaded bolt 49 which is articulated at the plate 43 by means of a pin 50. By adjusting the turning knob 47, the swivel plate 43 can be moved out of an oblique position (shown in a highly exaggerated manner in FIG. 3) into a position which is exactly parallel to the center axis of the leg 4 and the rollers 37 are accordingly aligned exactly in the direction of the leg 2 or in the running direction of the belt 22, respectively, so that any deviation from straight running can be overcome. A very sensitive adjustment can be carried out with the arrangement of the swivel device 47–50 which is at a great distance from the journal 44.

While the foregoing description and drawings represent the preferred embodiments of the present invention, it will be obvious to those skilled in the art that various changes and modifications may be made therein without departing from the true spirit and scope of the present invention.

What is claimed is:

1. In a traveling large-area welding machine for welding plastic sheets overlapping over the width of a zone having a frame formed by a first leg extending in the traveling direction of the machine and a second leg arranged transversely to the latter, wherein the first leg has means for welding the sheets in said zone as well as press-on means running on this zone for loading the welded sheets, and the second leg is provided with traveling rollers arranged on a common axle, and wherein the press-on means include a press-on roller which is connected via a common drive with the traveling rollers which are so arranged as to be offset to the latter in the direction of travel as well as transversely thereto, the improvement comprising that said press-on roller is supported at the first leg on an axle, said press-on roller being supplemented by additional press-on means to form a press-on and advancing movement device; said additional press-on means being freely movable vertically relative to the press-on roller and being driven by said common drive via an additional axle; and, said common axle carrying said traveling rollers being driven by a separate drive axle via a resilient slip clutch and wherein said press-on roller is a first such roller and the press-on and advancing movement device has a second press-on roller which runs in advance of said first press-on roller, a circumferentially extending press-on belt being looped around said second press-on roller along with said first press-on roller, said axle of the first press-on roller being driven by the common drive and supported in two holders which are swivelable in vertical planes and wherein an annular roll is arranged next to said first press-on roller so as to be axially parallel, but fitting loosely on its axle with radial play, said press-on belt likewise being looped around the annular roll so as to drive it.

2. The welding machine according to claim 1, wherein the width of said second press-on roller is equal to the overall width of said first press-on roller and said annular roll is arranged adjacent to it.

3. In a traveling large-area welding machine for welding plastic sheets overlapping over the width of a zone having a frame formed by a first leg extending in the traveling direction of the machine and a second leg arranged transversely to the latter, wherein the first leg has means for welding the sheets in said zone as well as press-on means running on this zone for loading the welded sheets, and the second leg is provided with traveling rollers arranged on a common axle, and wherein the press-on means include a press-on roller which is connected via a common drive with the traveling rollers which are so arranged as to be offset to the latter in the direction of travel as well as transversely thereto, the improvement comprising that said press-on roller is supported at the first leg on an axle, said press-on roller being supplemented additional press-on means to form a press-on and advancing movement device; said additional press-on means being freely movable vertically relative to the press-on roller and being driven by said common drive via an additional axle; and, said common axle carrying said traveling rollers being driven by a separate drive axle via a resilient slip clutch and wherein the common axle carrying the traveling rollers is adjustable by means for adjusting the roller traveling track with respect to the frame and wherein, in said means for adjusting the roller traveling track, the common axle is supported at a swivel plate which is articulated at the aforementioned second leg via a swivel axle and is connected with the leg at a location at a distance from the swivel axle via an adjusting device.

* * * * *